US011902345B2

(12) United States Patent
Sodagar

(10) Patent No.: US 11,902,345 B2
(45) Date of Patent: Feb. 13, 2024

(54) METHOD AND APPARATUS FOR CONTRIBUTION REPORTING OF UPLINK STREAMING IN 5G NETWORKS

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/885,061

(22) Filed: Aug. 10, 2022

(65) Prior Publication Data

US 2023/0055957 A1 Feb. 23, 2023

Related U.S. Application Data

(60) Provisional application No. 63/232,012, filed on Aug. 11, 2021.

(51) Int. Cl.
| | |
|---|---|
| *H04L 12/26* | (2006.01) |
| *H04L 29/06* | (2006.01) |
| *H04L 65/61* | (2022.01) |
| *H04L 65/1066* | (2022.01) |
| *H04L 65/1063* | (2022.01) |
| *H04L 43/065* | (2022.01) |
| *H04L 43/0882* | (2022.01) |

(52) U.S. Cl.
CPC .......... *H04L 65/61* (2022.05); *H04L 43/065* (2013.01); *H04L 43/0882* (2013.01); *H04L 65/1063* (2013.01); *H04L 65/1066* (2013.01)

(58) Field of Classification Search
CPC ......... H04L 43/06–065; H04L 43/0876; H04L 43/0882; H04L 43/091; H04L 65/60–612
See application file for complete search history.

(56) References Cited

U.S. PATENT DOCUMENTS

| | | | |
|---|---|---|---|
| 11,632,414 B2* | 4/2023 | Sodagar | .......... H04L 65/80 709/231 |
| 2018/0139773 A1 | 5/2018 | Ma et al. | |
| 2019/0173935 A1 | 6/2019 | Lohmar et al. | |
| 2019/0394498 A1 | 12/2019 | Lo et al. | |
| 2020/0274656 A1 | 8/2020 | Gordaychik | |

(Continued)

OTHER PUBLICATIONS

Dash-IF ("Guidelines for Implementation: Dash-IF Interoperability Points", Sep. 25, 2019, pp. 49-50, the AdaptationSet@ id indicates a coding scheme for the stream (e.g., H264 or HEVC) (Year: 2019).*

(Continued)

*Primary Examiner* — Boris D Grijalva Lobos
(74) *Attorney, Agent, or Firm* — Sughrue Mion, PLLC

(57) ABSTRACT

Systems, devices, and methods for reporting user equipment activity during a 5G Media Streaming (5GMS) uplink streaming session are provided, which may include initializing contribution reporting based on selected user preferences during media streaming during the 5GMS uplink streaming session, and transmitting a contribution report associated with the media streaming during the 5GMS uplink streaming session. The approach may further include generating a final contribution report associated with the media streaming during the 5GMS uplink streaming session in response to receiving a signal to stop media streaming.

20 Claims, 6 Drawing Sheets

(56) References Cited

U.S. PATENT DOCUMENTS

2020/0374689 A1* 11/2020 Shi ........................ H04L 61/00
2023/0119696 A1* 4/2023 Szucs ................... H04W 24/10
　　　　　　　　　　　　　　　　　　　　　　370/230
2023/0239333 A1* 7/2023 Lo .......................... H04L 43/06
　　　　　　　　　　　　　　　　　　　　　　455/414.1

OTHER PUBLICATIONS

International Search Report dated Dec. 5, 2022 in Application No. PCT/US2022/040027.
Written Opinion of the International Searching Authority dated Dec. 5, 2022 in Application No. PCT/US2022/040027.
5G, "5G Media Streaming (5GMS)", ETSI TS 126 501, 3GPP TS 26.501 V16.7.0, 2021, 50 total pages.
"3rd Generation Partnership Project; Technical Specification Group Services and System Aspects; 5G Media Streaming (5GMS)"; Protocols (Release 16), Jun. 2021, 3GPP TS26.512 V16.3.0.
"3rd Generation Partnership Project; Technical Specification Group Services and System Aspects; 5G Media Streaming (5GMS); General description and architecture (Release 16)", Jun. 2021, 3GPP TS 26.501 V16.8.0.
Tencent,"[FS_5GMS-EXT] Uplink Streaming: Contribution Reporting" 3GPP SA4#115-e, S4-211096, Aug. 18-27, 2021 (5 pages).
Qualcomm Incorporated,"Updated text on uplink streaming", 3GPP TSG-SA4, Meeting #114e, S4-210775, Telco May 19-28, 2021 (3 pages).
Ericsson LM, et al. "[FS_5GMS-EXT] Key Topic Uplink media streaming" SA4-e (AH) MBS SWG post 112-e, S4-al201129, Feb. 25, 2021 (7 pages).
Extended European Search Report dated Sep. 19, 2023 in Application No. 22856593.3.

* cited by examiner

METHOD AND APPARATUS FOR CONTRIBUTION REPORTING OF UPLINK STREAMING IN 5G NETWORKS

CROSS-REFERENCE TO RELATED APPLICATION

This application claims priority from U.S. Provisional Application No. 63/232,012, filed on Aug. 11, 2021, in the United States Patent and Trademark Office, the disclosure of which is incorporated herein by reference in its entirety.

FIELD

Embodiments of this disclosure are directed to media processing and streaming methods and systems, more particularly to performing uplink streaming in multiple different deployment scenarios.

BACKGROUND

The 5G media streaming architecture defined in 3GPP TS26.512 (3rd Generation Partnership Project; Technical Specification Group Services and System Aspects; 5G Media Streaming (5GMS)) only defined the concept of uplink streaming where the content is streamed from the device to an external Service Provider. While 3GPP TS26.512 defined the consumption reporting for downlink streaming, it does not define any method for reporting uplink-streaming activities.

SUMMARY

According to one or more embodiments, a method for reporting user equipment activity during a 5G Media Streaming (5GMS) uplink streaming session may be provided. The method may be performed by at least one processor, and may include initializing contribution reporting during media streaming during the 5GMS uplink streaming session; transmitting a contribution report associated with the media streaming during the 5GMS uplink streaming session, wherein the contribution report is based on selected user preferences; and in response to receiving a signal to stop media streaming, generating a final contribution report associated with the media streaming during the 5GMS uplink streaming session.

According to one or more embodiments, a device for reporting user equipment activity during a 5G Media Streaming (5GMS) uplink streaming session may be provided. The device may include at least one memory configured to store program code; and at least one processor configured to read the program code and operate as instructed by the program code. The program code may include initializing code configured to cause the at least one processor to initialize contribution reporting during media streaming during the 5GMS uplink streaming; first transmitting code configured to cause the at least one processor to transmit a contribution report associated with the media streaming during the 5GMS uplink streaming session, wherein the contribution report is based on selected user preferences; and in response to receiving a signal to stop media streaming, first generating code configured to cause the at least one processor to generate a final contribution report associated with the media streaming during the 5GMS uplink streaming session.

According to one or more embodiments, a non-transitory computer-readable medium stores instructions, the instructions including: one or more instructions that, when executed by one or more processors of a device for 5G media streaming (5GMS), cause the one or more processors to: initialize contribution reporting during media streaming during the 5GMS uplink streaming session; transmit a contribution report associated with the media streaming during the 5GMS uplink streaming session, wherein the contribution report is based on user preferences; and in response to receiving a signal to stop media streaming, generate a final contribution report associated with the media streaming during the 5GMS uplink streaming session.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
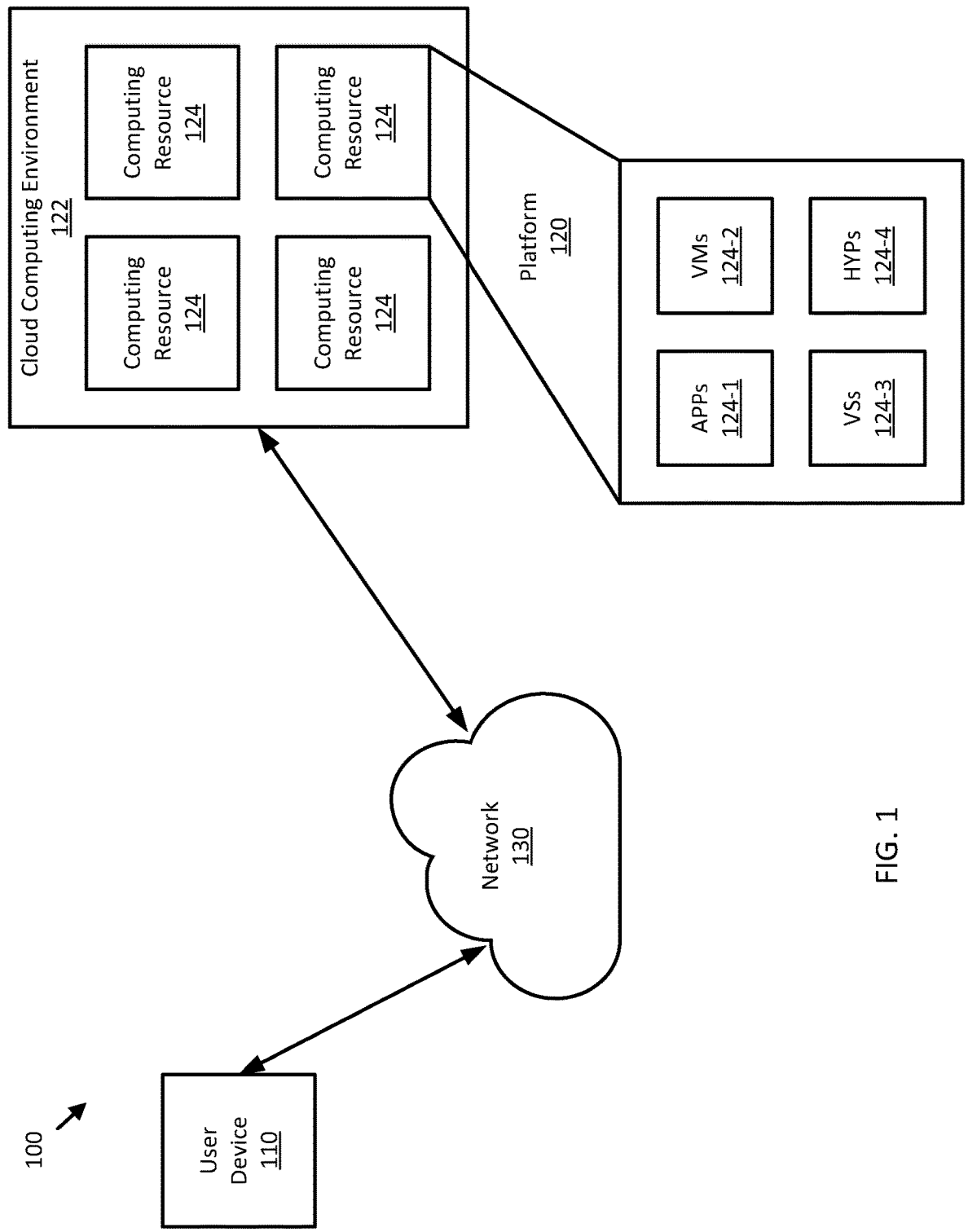
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
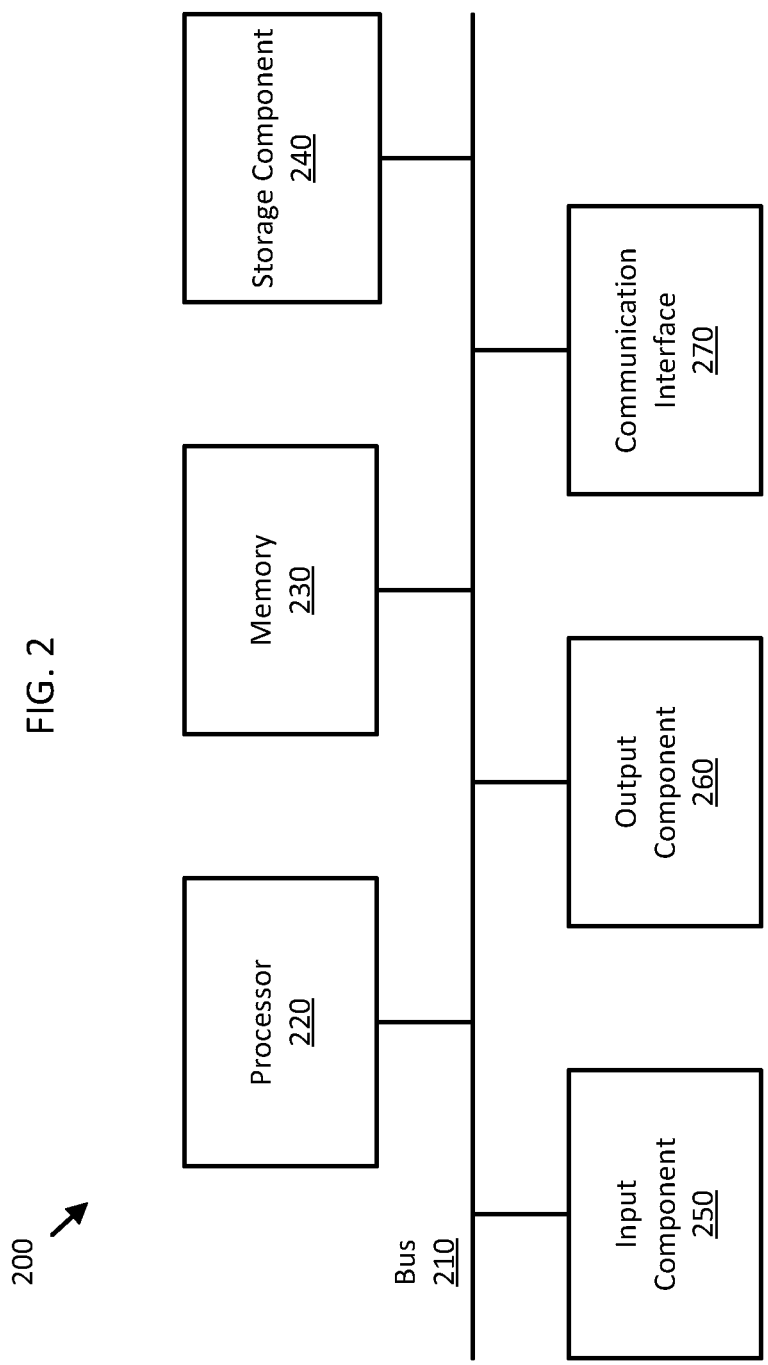
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of AFs, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

The 5G media streaming architecture defined in 3GPP TS26.501 (3rd Generation Partnership Project; Technical Specification Group Services and System Aspects; 5G Media Streaming (5GMS); General description and architecture (Release 16), V16.3.1) only defines a general architecture for uplink and downlink media streaming. Further, 3GPP TS26.512 defines the concept of uplink streaming where the content is streamed from the device to an external Service Provider.

Figure 3:
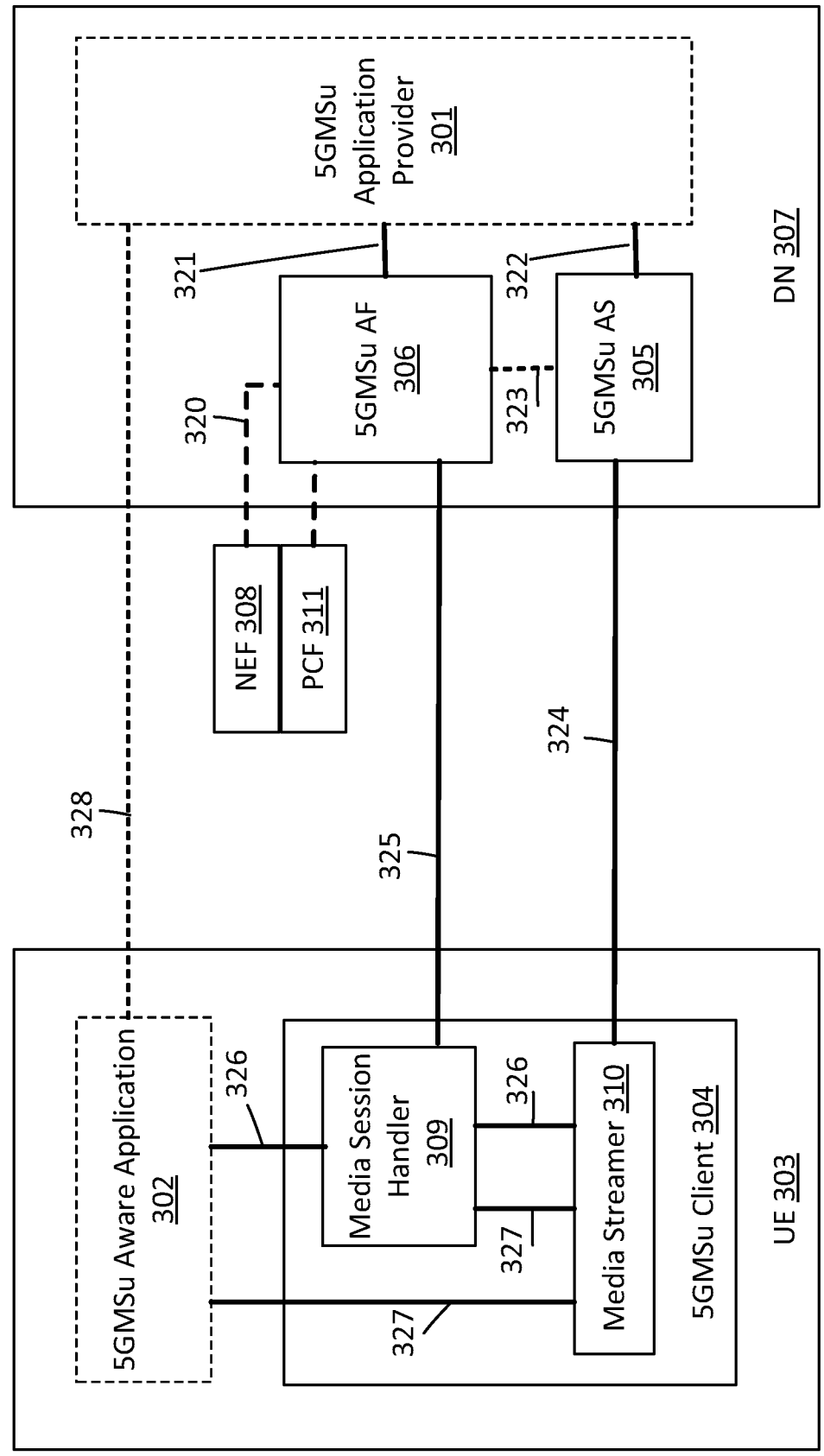
FIG. 3 is a block diagram of a media architecture for media uplink streaming, according to embodiments.

A 5G media-streaming architecture for uplink streaming is shown in FIG. 3.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320. In embodiments, link 320 may relate to N33, which may be an API.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 305 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

As discussed above, 3GPP TS26.501 defines a general architecture for uplink and downlink media streaming, and 3GPP TS26.512 defines the concept of uplink streaming where the content is streamed from the device to an external Service Provider. According to embodiments, architectures and call flows for various collaboration scenarios for uplink streaming may be provided.

Figure 4:
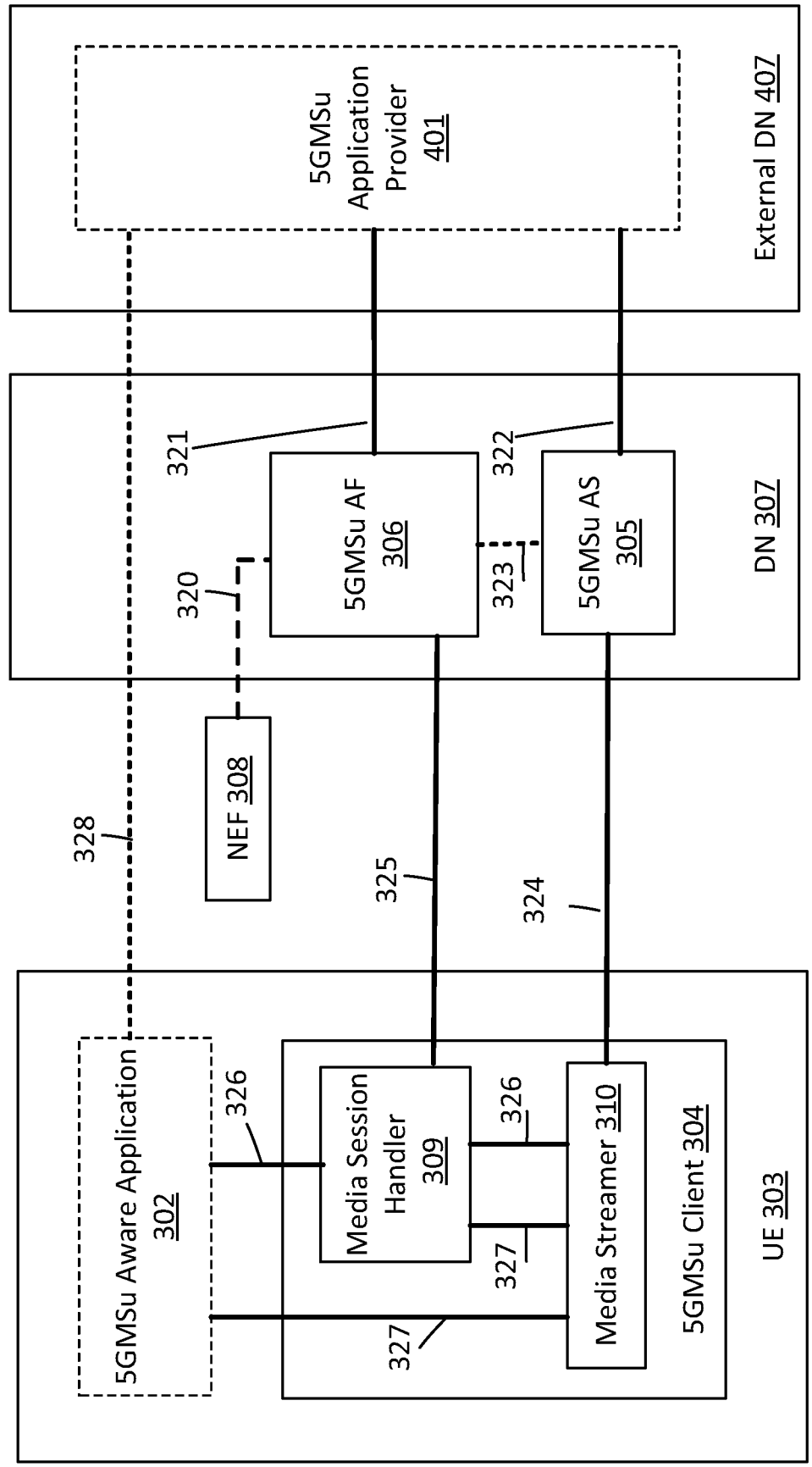
FIG. 4 is a block diagram of a media architecture for media uplink streaming, according to embodiments.

FIG. 4 is a diagram of a media architecture 400 for media uplink streaming, according to embodiments. As can be seen in FIG. 4, media architecture 400 may be similar to media architecture 300, except that 5GMSu Aware Application 302, 5GMSu AF 306, and 5GMSu AS 305 may be in communication with 5GMSu Application Provider 401. In embodiments, 5GMSd Application Provider 401 may be included in external DN 407, rather than trusted DN 307.

In embodiments, media architecture 400 may relate to a collaboration scenario involving a media plane only collaboration for which the 5GMSu AS 305 is deployed in the trusted DN 307. In embodiments, the 5GMS System Provider associated with trusted DN 307 may offer uplink streaming capabilities as a service to 5GMSu Application Provider 401 in the external DN 407.

The components of media architecture 300 and media architecture 400 may be implemented using hardware, firmware, software, or a combination of hardware and software. For example, the components of media architecture 300 and 400 may be implemented as hardware circuitry, one or more microchips, ASICs, one or more processors running computer program code stored on at least one memory (e.g., RAM, ROM or other dynamic or static memory devices), one or more microcontrollers, one or more DSPs, FPGAs, other types of processing components/circuitry, or any combination of the above.

As stated above, while 3GPP TS26.501 and TS26.512 define the general uplink process, they do not define a method for configuring and reporting uplink streaming activities. TS26.512 defines consumption reporting but only for downlink streaming. The consumption reports are generated by the user equipment (UE) and include information about the format of the consumption report and consumption-reporting units. However, there is no defined mechanism for reporting the UE's activities during the uplink streaming session.

TABLE 1

Consumption/Contribution Report Format

| PROPERTY NAME | DATA TYPE | CARDINALITY | DESCRIPTION |
|---|---|---|---|
| mediaPlayerEntry | string | 1 . . . 1 | Identifies the Media player entry. For DASH, the media player entry pointer shall be the URL of the MPD. |
| reportingClientId | string | 1 . . . 1 | Identifier of the reporting client that consumed the streaming media service associated with this consumption report. If available to the Media Session Handler, a GPSI value (see clause 28.8 of TS 23.003); otherwise, a stable and globally unique string. |
| consumption Reporting Units | Array(Consumption ReportingUnit) | 1 . . . 1 | An array of consumption reporting units. |

TABLE 2

Definition of type ConsumptionReportingUnit

| ATTRIBUTE NAME | DATA TYPE | CARDINALITY | 1. DESCRIPTION |
|---|---|---|---|
| mediaConsumed | string | 1 . . . 1 | Identifies the media consumed. For DASH, the value of the Representation@id attribute shall be quoted. |
| startTime | DateTime | 1 . . . 1 | The time when this consumption reporting unit started. |
| duration | DurationSec | 1 . . . 1 | The duration of this consumption reporting unit. |
| locations | Array(TypedLocation) | 0 . . . 1 | Identifies the UE location(s) where the media was consumed if location reporting is enabled in the Consumption Reporting Configuration (only for trusted AF). The cardinality of objects in this array may be 1 . . . N. |

According to an embodiment of the present disclosure, methods and apparatus for contribution reporting by the UE that has established an uplink session with a 5G network are provided. The contribution reports may provide a summary report about the media uplink streaming session and related information including a media entry address and media entry type for uplink streaming; start time and duration of media uplink streaming; and the UEs location. In some embodiments, the contribution reports can be configured to be sent to one or more servers including 5GMSus and external servers. The reports can be configured to be issued at specific intervals. The intervals may be user defined or may be based on user preferences. The 5G network may be configured to generate consumption reports for all UEs or for some sample percentage of UEs.

According to embodiments, one or more parameters may be used to configure the contribution reporting by the 5G network.

TABLE 3

Contribution Reporting Configuration Parameters

| PARAMETERS | DESCRIPTION |
|---|---|
| Reporting interval | Identifies the interval between contribution reports being sent by the Media Session Handler. |
| Server address | A list of 5GMSu AF addresses where the contribution reports are sent by the Media Session Handler. |
| Sample percentage | The proportion of clients that shall report media contributions. In some embodiments, if not specified, all clients shall send reports. |
| Location reporting | Identifies whether the Media Session Handler provides location data to the 5GMSu AF (in case of MNO or trusted third parties) |

According to embodiments, a contribution provisioning application programming interface (API) may be used to provision resources for contribution reporting by the 5G network. As an example, contribution reporting provisioning API may be a RESTful API and may be accessed through a URL base path such as {apiRoot}/3gpp-m1/v1/provisioning-sessions/ {provisioningSessionId}/ entry points (for both download or upload) enabling the 5GMS network to signal a variety of media entry points for uplink streaming in the contribution reports, both uplink and downlink contribution reports.

Figure 5:
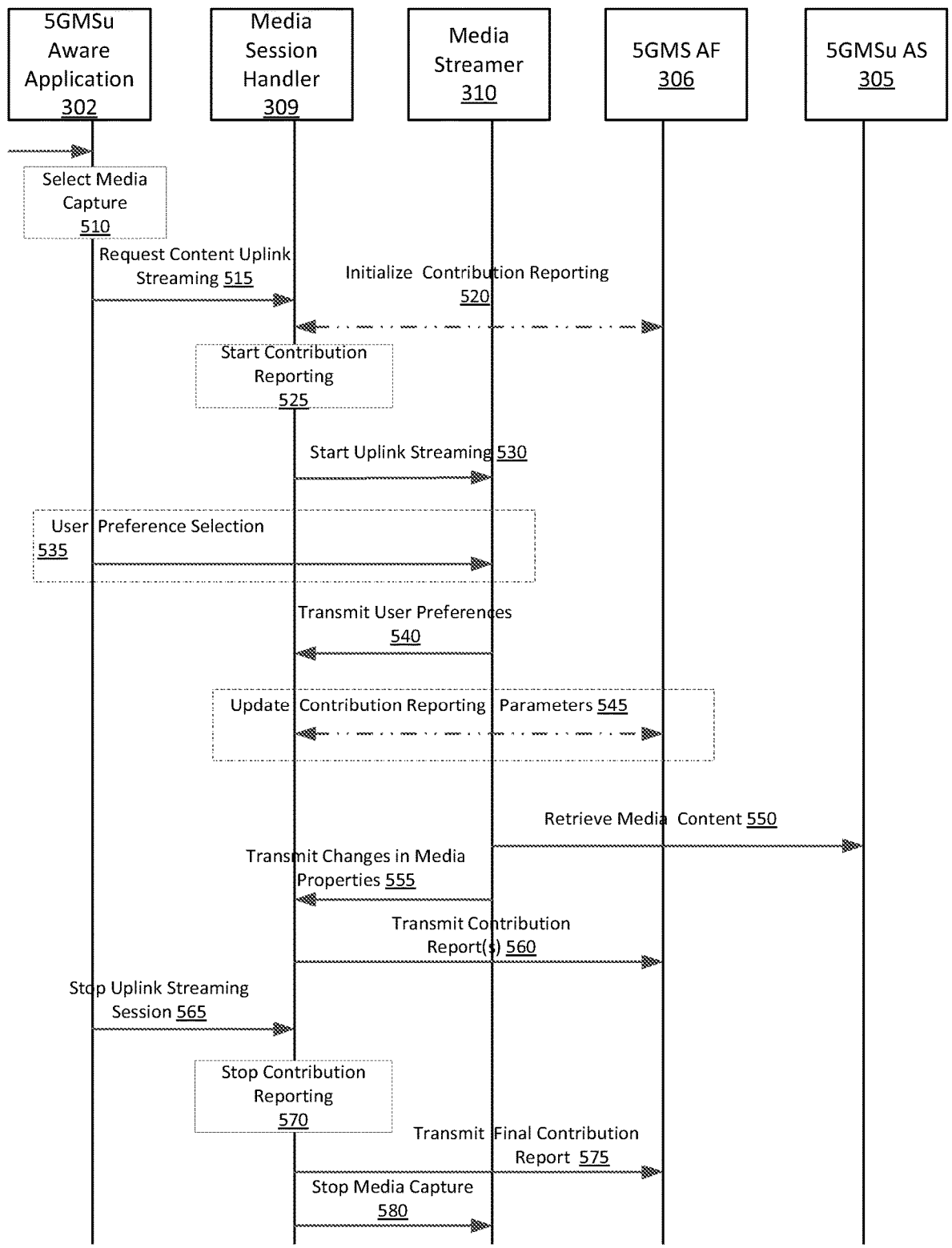
FIG. 5 is a flowchart of an example process of contribution reporting during 5G media uplink streaming, according to embodiments.

FIG. 5 is a flowchart of example process 500 for contribution reporting during uplink streaming with respect to media architecture 300 or media architecture 400, according

TABLE 4

Operations Supported by Contribution Reporting Provisioning API

| OPERATION | OPERATION | ALLOWED HTTP METHOD(S) | DESCRIPTION |
|---|---|---|---|
| Activate Contribution Reporting procedure with a Contribution Reporting Configuration | contribution-reporting-configuration | POST | Activate the contribution reporting procedure and set the Contribution Reporting Configuration. |
| Fetch Contribution Reporting Configuration | | GET | Retrieve an existing Contribution Reporting Configuration. |
| Update Contribution Reporting Configuration | | PUT, PATCH | Modify an existing Contribution Reporting Configuration. |
| Delete Contribution Reporting Configuration | | DELETE | Deactivate the Contribution reporting procedure for that particular session. |

According to embodiments, one or more parameters may be included in the contribution report.

TABLE 5

Contribution Reporting Parameters

| PARAMETERS | DESCRIPTION |
|---|---|
| Media Entry Type | A fully-qualified term identifier from the controlled vocabulary urn:3gpp:5gms:content-protocol, indicating the type of media at Media Entry. |
| Media Entry | Depending on the type of media entry indicated in Media Entry Type, either a URL endpoint on the 5GMSu AS to which media can be streamed directly at M4u, or else the URL of a document that can be downloaded from the 5GMSu AS which contains the parameters for uplink media streaming at M4u. |
| Consumption reporting client ID | An identifier of the UE that contributes the media. |
| Location type | Identifies the UE location type. May be used when the location reporting is enabled for the UE or for the Downlink Streaming session with a condition that the UE allows sharing its location within the operator's trust domain. The location type may be CGI, ECGI, or NCGI as defined in TS 23.003. |
| Location | Identifies the UE location. This parameter may be used when location reporting is enabled for the UE or for the Downlink Streaming session, and when the UE allows its location to be shared within the Network Operator's trust domain. |
| Media contributed | Identifies the contributed media. The Media Entry Type defines the scheme and possible values for this identifier. |
| Start time | Identifies the start time when contributed media started. |
| Duration | Determined the duration of contributed media relative to the start time. |

While 5G media streaming architecture defines the consumption reporting for downlink streaming, it lacks the concept of contribution reporting for uplink streaming. In the present disclosure, embodiments disclose methods for provisioning the contribution reporting during uplink streaming in the 5G media streaming architecture. Furthermore, according to an embodiment, a media entry type is disclosed which may allow defining more extensive media to embodiments. At operation 505, a 5GMSu aware application 302 may be started and may be configured to establish an uplink streaming session with a 5GMS network. At operation 510, the 5GMSu aware application 302, the 5GMSu client 304, or the UE 303 may select the media content to be captured to be transmitted during an uplink streaming session. At operation 515, the 5GMSu aware application 302, the 5GMSu client 304, or the UE 303 may trigger the media session handler 309 to start content uplink streaming. The 5GMSu aware application 302, the 5GMSu client 304, or the UE 303 may provide the media entry address and/or the media entry type of the selected media content to be transmitted during the uplink streaming session. In some embodiments, the 5GMSu aware application 302 may provide additional information (e.g., information from Tables 1-5 as disclosed herein) to the media session handler 309. At operation 520, the 5GMSu AF 306 may initialize the one or more parameters associated with the contribution reporting and the configuration of the contribution report. In some embodiments, the 5GMSu AF 306 may initialize the one or more parameters associated with the contribution reporting and the configuration of the contribution report based on the content uplink streaming request from the media session handler 309.

At operation 525, the media session handler 309 may trigger the contribution reporting. At operation 530, the media session handler 309 may start the media streamer 310 to begin the uplink media streaming based on the media entry address and media entry type.

At operations 535-540, the user preferences may be received or may be updated by the media session handler 309. For example, at operation 535, the user, through the 5GMSu aware application 302, may select, or change the user preferences. At operation 540, the media streamer may transmit and the 5GMSu AF 306 may receive the selected or updated user preferences. At operation 545, the 5GMSu AF 306 may update the parameters associated with the contribution reports.

At operation 550, the media streamer 310 may retrieve media based on the media entry address and the media entry type. In case on changes to the media properties, the media streamer 310 may transmit the changes in the media properties to the media session handler 309 at operation 555. At operation 560, the media session handler generates the contribution report and transmits the contribution report to the 5GMSu AF 306. The 5GMSu AF 306 may receive the contribution reports at predetermined time intervals, and the contribution reports may poll a sample proportion of the UEs in the 5G network.

At operation 565, the 5GMSu aware application 302 may trigger the media session handler 309 to stop media content playback. In response to receiving an indication to stop the media playback, the media session handler 309 may stop the contribution reporting at operation 570. Then, at operation 575, the media session handler 309 may transmit the final contribution report to the 5GMSu AF 306. At operation 580, the media session handler 309 may send an indication to the media streamer 310 to stop the media capture of the selected media.

Figure 6:
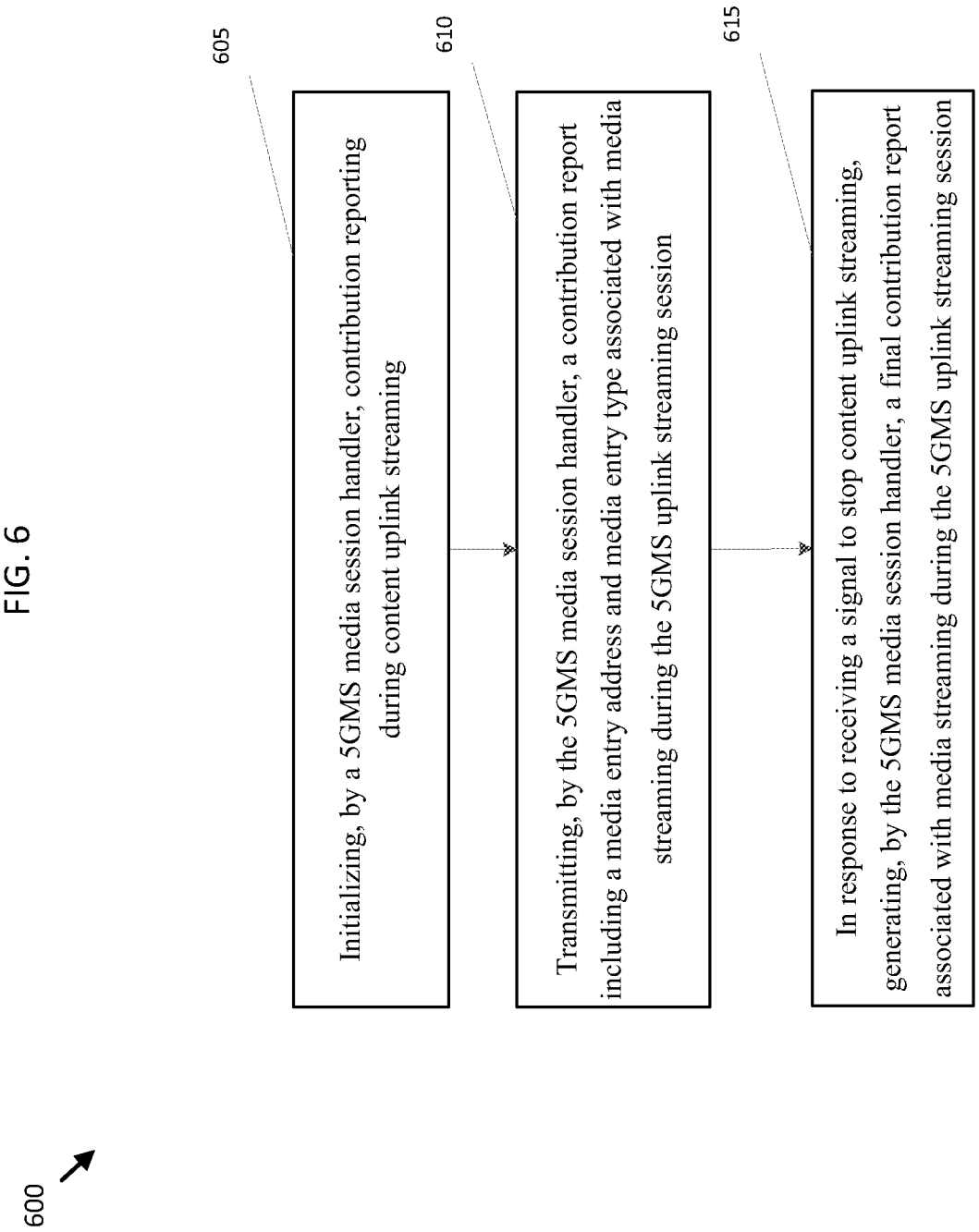
FIG. 6 is a flowchart of an example process of contribution reporting during 5G media uplink streaming, according to embodiments.

FIG. 6 is a flowchart of example process 600 corresponding to the collaboration scenario described above with respect to media architecture 500, according to embodiments.

At operation 605, a media session handler may initialize contribution reporting during content uplink streaming.

At operation 610, the media session handler may transmit a contribution report associated with media streaming during the 5GMS uplink streaming session, wherein the contribution report is based on selected user preferences. In some embodiments, the transmitting may include the media session handler receiving the selected user preferences and transmitting one or more parameters of the contribution report based on the selected user preferences. The media session handler may control retrieval of media content to be streamed during the 5GMS uplink streaming session. The retrieval of the media content to be streamed may be controlled based on a media entry address associated with the media content and a media entry type associated with the media content. The media session handler may receive changes in media properties of the media content. Further, the media session handler may generate and transmit the contribution report based on the media content and changes in media properties of the media content.

The contribution report may include a media entry address associated with media content being streamed during the 5GMS uplink streaming session and media entry type associated with the media content being streamed during the 5GMS uplink streaming session. The contribution report may also include a start time associated with the media content being streamed during the 5GMS uplink streaming session, an end time associated with the media content being streamed during the 5GMS uplink streaming session, and a duration associated with the media content being streamed during the 5GMS uplink streaming session. In some embodiments, the contribution report may also include a location associated with user equipment during the 5GMS uplink streaming session.

The one or more parameters of the contribution report may include a reporting interval, one or more addresses associated with one or more 5GMSu Application Functions, a threshold of contribution reports to be transmitted, or location reporting flag. In some embodiments, the media entry type associated with the media content may be streamed during the 5GMS uplink streaming session indicates a scheme to stream the media content.

At operation 615, the media session handler may generate a final contribution report associated with media streaming during the 5GMS uplink streaming session in response to receiving a signal to stop content uplink streaming.

In some embodiments, the contribution report and the final contribution report may be transmitted by the media session handler to a one or more 5GMSu Application Functions.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for reporting user equipment activity during a 5G Media Streaming (5GMS) uplink streaming session, the method being performed by at least one processor, the method comprising:
    initializing contribution reporting during media streaming during the 5GMS uplink streaming session;
    transmitting a contribution report associated with the media streaming during the 5GMS uplink streaming session, wherein the contribution report is based on selected user preferences,
        wherein the contribution report comprises a media entry type parameter that indicates whether a media entry is a universal resource locator (URL) endpoint on a 5GMS Application Server (AS) or a URL of a document to be downloaded from the 5GMS AS; and
    in response to receiving a signal to stop media streaming, generating a final contribution report associated with the media streaming during the 5GMS uplink streaming session.

2. The method of claim 1, wherein the contribution report comprises a media entry address associated with media content being streamed during the 5GMS uplink streaming session and media entry type associated with the media content being streamed during the 5GMS uplink streaming session.

3. The method of claim 2, wherein the contribution report further comprises a start time associated with the media content being streamed during the 5GMS uplink streaming session, an end time associated with the media content being streamed during the 5GMS uplink streaming session, and a duration associated with the media content being streamed during the 5GMS uplink streaming session.

4. The method of claim 3, wherein the contribution report further comprises a location associated with user equipment during the 5GMS uplink streaming session.

5. The method of claim 1, wherein the contribution report and the final contribution report are transmitted to one or more 5GMSu Application Functions.

6. The method of claim 1, wherein transmitting the contribution report comprises:
    receiving the selected user preferences; and
    transmitting one or more parameters of the contribution report based on the selected user preferences.

7. The method of claim 6, further comprising:
    controlling retrieval of media content to be streamed during the 5GMS uplink streaming session, wherein the retrieval of the media content to be streamed is controlled based on a media entry address associated with the media content and a media entry type associated with the media content;
    receiving changes in media properties of the media content; and
    transmitting the contribution report based on the media content and changes in media properties of the media content.

8. The method of claim 6, wherein the one or more parameters of the contribution report include a reporting interval, one or more addresses associated with one or more 5GMSu Application Functions, a threshold of contribution reports to be transmitted, or location reporting flag.

9. The method of claim 2, wherein the media entry type associated with the media content being streamed during the 5GMS uplink streaming session indicates a scheme to stream the media content.

10. A device for reporting user equipment activity during a 5G Media Streaming (5GMS) uplink streaming session, the device comprising:
    at least one memory configured to store program code; and
    at least one processor configured to read the program code and operate as instructed by the program code, the program code including:
        initializing code configured to cause the at least one processor to initialize contribution reporting during media streaming during the 5GMS uplink streaming session;
        first transmitting code configured to cause the at least one processor to transmit a contribution report associated with the media streaming during the 5GMS uplink streaming session, wherein the contribution report is based on selected user preferences,
            wherein the contribution report comprises a media entry type parameter that indicates whether a media entry is a universal resource locator (URL) endpoint on a 5GMS Application Server (AS) or a URL of a document to be downloaded from the 5GMS AS; and
        in response to receiving a signal to stop media streaming, first generating code configured to cause the at least one processor to generate a final contribution report associated with the media streaming during the 5GMS uplink streaming session.

11. The device of claim 10, wherein the contribution report comprises a media entry address associated with media content being streamed during the 5GMS uplink streaming session and media entry type associated with the media content being streamed during the 5GMS uplink streaming session.

12. The device of claim 11, wherein the contribution report further comprises a start time associated with the media content being streamed during the 5GMS uplink streaming session, an end time associated with the media content being streamed during the 5GMS uplink streaming session, and a duration associated with the media content being streamed during the 5GMS uplink streaming session.

13. The device of claim 12, wherein the contribution report further comprises a location associated with the user equipment during the 5GMS uplink streaming session.

14. The device of claim 10, wherein the first transmitting code is further configured to cause the at least one processor to transmit the contribution report and the final contribution report to a one or more 5GMSu Application Functions.

15. The device of claim 10, wherein the first transmitting code further comprises:

first receiving code configured to cause the at least one processor to receive the selected user preferences; and second transmitting code configured to cause the at least one processor to transmit one or more parameters of the contribution report based on the selected user preferences.

16. The device of claim 15, wherein the first transmitting code further comprises:

controlling code configured to cause the at least one processor to control retrieval of media content to be streamed during the 5GMS uplink streaming session, wherein the retrieval of the media content to be streamed is controlled based on a media entry address associated with the media content and a media entry type associated with the media content;

second receiving code configured to cause the at least one processor to receive changes in media properties of the media content; and third transmitting code configured to cause the at least one processor to transmit the contribution report based on the media content and changes in media properties of the media content.

17. The device of claim 15, wherein the one or more parameters of the contribution report include a reporting interval, one or more addresses associated with one or more 5GMSu Application Functions, a threshold of contribution reports to be transmitted, or location reporting flag.

18. The device of claim 11, wherein the media entry type associated with the media content being streamed during the 5GMS uplink streaming session indicates a scheme to stream the media content.

19. A non-transitory computer-readable medium storing instructions, the instructions comprising: one or more instructions that, when executed by one or more processors of a device for 5G media streaming (5GMS), cause the one or more processors to:

initialize contribution reporting during media streaming during the 5GMS uplink streaming session;

transmit a contribution report associated with the media streaming during the 5GMS uplink streaming session, wherein the contribution report is based on user preferences, wherein the contribution report comprises a media entry type parameter that indicates whether a media entry is a universal resource locator (URL) endpoint on a 5GMS Application Server (AS) or a URL of a document to be downloaded from the 5GMS AS; and in response to receiving a signal to stop media streaming, generate a final contribution report associated with the media streaming during the 5GMS uplink streaming session.

20. The non-transitory computer-readable medium of claim 19, wherein the contribution report comprises a media entry address associated with media content being streamed during the 5GMS uplink streaming session and media entry type associated with the media content being streamed during the 5GMS uplink streaming session.

* * * * *